(12) United States Patent
Rasaratnam

(10) Patent No.: US 8,760,132 B2
(45) Date of Patent: Jun. 24, 2014

(54) SUPPLY VOLTAGE INDEPENDENT QUICK RECOVERY REGULATOR CLAMP

(75) Inventor: Dayananda Kumar Rasaratnam, West Lothian (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 337 days.

(21) Appl. No.: 12/822,559

(22) Filed: Jun. 24, 2010

(65) Prior Publication Data

US 2010/0327840 A1 Dec. 30, 2010

(30) Foreign Application Priority Data

Jun. 25, 2009 (GB) .................................. 0910939.8

(51) Int. Cl.
*G05F 1/569* (2006.01)
(52) U.S. Cl.
USPC ............................. 323/276; 323/274; 323/317
(58) Field of Classification Search
USPC ................. 323/373–281, 273–281, 313, 317; 327/340, 341, 343; 361/18
See application file for complete search history.

(56) References Cited

U.S. PATENT DOCUMENTS

| 5,694,031 | A  | * | 12/1997 | Stanojevic .................... 323/313 |
| 5,933,034 | A  | * | 8/1999  | Hastings et al. ............... 327/108 |
| 6,188,211 | B1 | * | 2/2001  | Rincon-Mora et al. ........ 323/280 |
| 7,224,155 | B2 | * | 5/2007  | Bo et al. ......................... 323/312 |
| 7,821,328 | B2 | * | 10/2010 | Hoque et al. .................. 327/536 |
| 7,977,932 | B2 | * | 7/2011  | Morishita ...................... 323/314 |
| 2003/0011586 | A1 |  | 1/2003 | Nakajima ...................... 345/211 |
| 2003/0030424 | A1 | * | 2/2003 | Hinterscher et al. .......... 323/313 |
| 2004/0070998 | A1 |  | 4/2004 | Deboes et al. .................. 363/28 |
| 2007/0041257 | A1 |  | 2/2007 | Kim ............................... 365/207 |
| 2007/0121358 | A1 |  | 5/2007 | Hirota et al. ....................... 365/1 |
| 2009/0147542 | A1 |  | 6/2009 | Kuttner et al. .................. 363/16 |

FOREIGN PATENT DOCUMENTS

EP 0760513 8/1996 ............... G11C 5/14

* cited by examiner

*Primary Examiner* — Gary L Laxton
(74) *Attorney, Agent, or Firm* — Allen, Dyer, Doppelt, Milbrath & Gilchrist, P.A.

(57) ABSTRACT

Disclosed is an output stage, and associated apparatus, for a voltage regulator that includes a clamp circuit that is operable to ensure that the output voltage recovers quickly, i.e. that the perturbation of this voltage is limited and remains within a given specification, when entering a standby mode and which is controlled in a supply independent manner.

20 Claims, 3 Drawing Sheets

SUPPLY VOLTAGE INDEPENDENT QUICK RECOVERY REGULATOR CLAMP

FIELD OF THE INVENTION

The invention relates to voltage regulator clamps, and in particular to a voltage regulator clamp that is operable to ensure that the output voltage recovers quickly, i.e. that the perturbation of this voltage is limited and remains within a given specification, when entering a standby mode.

BACKGROUND OF THE INVENTION

Voltage regulators which supply the digital core logic in mobile devices (for example a camera phone) often operate in a low power 'standby' mode. They should be able to transition 'gracefully' into and out of this mode without introducing undesirable transient voltage changes and a consequent loss of data.

A known type of architecture for realizing this incorporates a pair of regulators in parallel, an auxiliary (low power) PMOS output regulator which provides regulation in the low power 'standby' mode, and a main NMOS output regulator which handles the high load current requirement during normal operation, that is in the 'streaming' mode. The outputs of these two regulators are connected together. The PMOS output regulator is set to provide a slightly lower voltage than the stronger NMOS output regulator and is forced off when the latter regulator is enabled, during a transition from the 'standby' mode to the 'streaming' mode. A return to the 'standby' mode from the 'streaming' mode is completed when the NMOS output regulator is disabled and the PMOS output regulator regains control of the output.

It is highly desirable for the regulated output voltage to remain within specification at all times. This requirement poses specific design challenges during the transitions between the 'standby' and 'streaming' modes of operation. In particular, during the transition from 'streaming' mode to 'standby' mode, the auxiliary regulator should turn on quickly enough, as the main regulator turns off, to take over the regulation of the output and help prevent its voltage from falling below specification.

SUMMARY OF THE INVENTION

In a first aspect of the invention there is an output stage for an auxiliary voltage regulator operable to provide a regulated supply to an apparatus when in a standby mode comprising at least one output device having a control electrode. A clamping circuit comprises a clamping device operable to reduce voltage swings on the control electrode when the apparatus is not operating in the standby mode, therefore allowing faster switching on of the output device when the apparatus is switched into the standby mode. The clamping device is preferably controlled in a supply independent manner.

The clamping device may be controlled according to the signal level on the control electrode of the output device. The clamping circuit may comprise a further device operable to force the clamping device off when the apparatus operates in the standby mode. The clamping circuit may be arranged such that a control electrode of the clamping device is controlled by an output terminal of the further device, the further device having a control electrode controlled by the signal level on the control electrode of the output device.

The clamping device may be arranged to ensure that the output device is prevented from turning off completely when the apparatus is not in the standby state. The output stage may additionally comprise a current sink from the clamping circuit to allow adjustment, if helpful with feedback control, for a variation in the load current at the output of the output stage when the apparatus is in the standby mode.

The output device, clamping device, and further device may comprise PMOS transistor devices, the clamping device for sinking current at the control electrode of the output device when the device is not in the standby mode. Each PMOS device may be paired with a NMOS biasing device. The clamping circuit may further comprise an offset device for providing a voltage offset at the location of the current sink. The offset device may be a transistor in a source follower configuration.

The clamping circuit may be operable such that, as the apparatus switches into standby mode and the signal on the control electrode of the output device rises, the consequent action of the clamping circuit causes the clamping device to sink an increasing amount of current at the control electrode of the output device until a state of equilibrium is reached in which the output device may be prevented from switching completely off.

In a further aspect, there is an auxiliary voltage regulator for providing a regulated supply to an apparatus when in a standby mode. The auxiliary voltage regulator comprises a differential amplifier circuit which outputs a control signal in accordance with a signal feedback from the voltage regulator's output and a reference signal, and an output stage. The output stage includes at least one output device having a control electrode controlled by the control signal, and a clamping circuit comprising a clamping device operable to reduce voltage swings on the control electrode when the apparatus is not operating in the standby mode, and to therefore allow faster switching on of the output device when the apparatus is switched into the standby mode. The clamping device may be controlled in a supply independent manner.

The clamping circuit may be operable such that, as the apparatus switches out of standby mode and the control signal output from the differential amplifier circuit rises, the action of the clamping circuit causes the clamping device to sink an increasing amount of current at the control electrode of the output device until a state of equilibrium is reached in which the output device is prevented from switching completely off.

In a further aspect, there is a mobile apparatus comprising a main voltage regulator for a main operating mode and an auxiliary voltage regulator for a standby mode. The auxiliary voltage regulator comprises a differential amplifier circuit which outputs a control signal in accordance with a signal feedback from the voltage regulator's output and a reference signal, and an output stage. The output stage includes at least one output device having a control electrode controlled by the control signal, and a clamping circuit comprising a clamping device operable to reduce voltage swings on the control electrode when the device is operating in the main operating mode, to therefore allow faster switching on of the output device when the apparatus is switched into the standby mode. The clamping may be controlled in a supply independent manner.

In another aspect, there is a method for controlling the signal level on the control electrode of an output device comprised within an output stage of an auxiliary voltage regulator for operating an apparatus in a standby mode. The method comprises sinking current from the input of the control electrode in a supply independent manner when the apparatus is not operating in the standby mode, so as to reduce voltage swings on the control electrode and to therefore allow faster switching on of the output device when the apparatus is switched into the standby mode.

It should be understood that the sinking of current at the input of the control electrode should also cover the sourcing of current at the input of the control electrode, depending on the characteristics of the output device, for example if the output device is a NMOS transistor, forming part of a negative voltage regulator, where the other transistor devices will also be of opposite type.

The sinking current at the input of the control electrode in a supply independent manner may comprise sinking current from the input of the control electrode using a clamping device, the clamping device being controlled so as to force the clamping device off when the apparatus operates in the standby mode. The clamping device may be controlled according to the signal level on the control electrode of the output device.

BRIEF DESCRIPTION OF THE DRAWINGS

Embodiments of the invention will now be described, by way of example only, by reference to the accompanying drawings, in which.

DETAILED DESCRIPTION OF THE PREFERRED EMBODIMENTS

Figure 1:
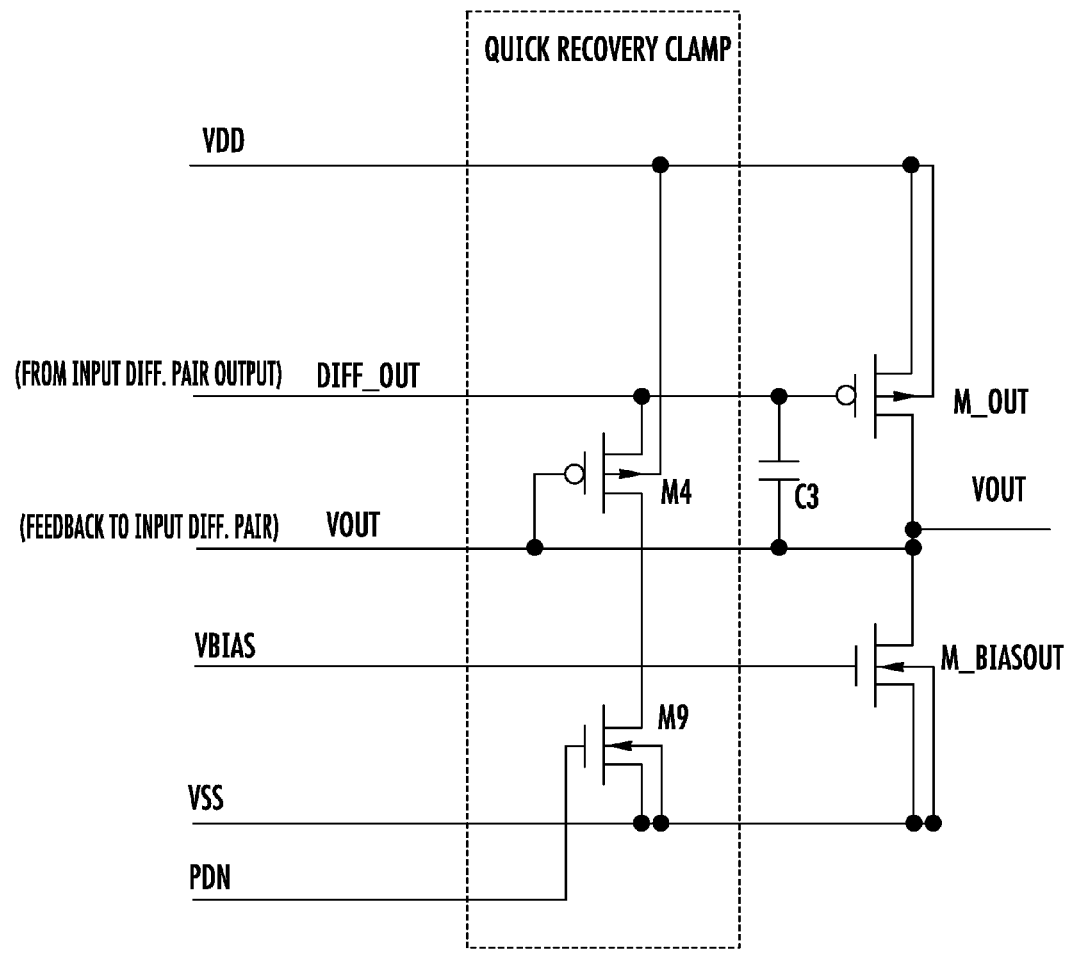
FIG. 1 shows a prior art circuit for providing a quick recovery auxiliary voltage regulator.

FIG. 1 shows a known PMOS output stage for an auxiliary regulator. It comprises output PMOS transistor M_OUT, capacitor C3, and bias transistor M_BIASOUT arranged as shown. The circuit incorporates a 'quick recovery' clamp PMOS transistor M4 (with accompanying NMOS transistor M9), to act as a clamp. The regulated output VOUT is taken from the drain of output transistor M_OUT, this signal also being fed back to the input of the regulator differential pair (not shown) while also controlling the gate of transistor M4. The output of the regulator differential pair is fed to the gate of transistor M_OUT, with transistor device M4's source electrode also connected here. Also shown are the power rails VDD and VSS, bias input VBIAS and power down line PDN.

The purpose of this clamp is to sink the current from one half of a current mirror load of the input differential amplifier when the main regulator forces a slightly higher voltage at the output, so as to over-ride the auxiliary regulator and take control, forcing the auxiliary regulator out of its closed loop state. This helps prevent the voltage at the gate of the output transistor M_OUT from rising up to the supply voltage VDD, thereby helping to prevent the magnitude of the gate-source voltage of this output transistor M_OUT from falling much below its threshold value. Consequently, there is a reduction in the voltage excursion at the gate of the output transistor M_OUT and therefore the magnitude of the transient dip in the output voltage on re-entry into the 'standby' mode, when the main regulator relinquishes control of the output.

When the auxiliary regulator is working normally, transistor M4 may remain switched off. This is useful if the supply voltage VDD remains below a level given by the aggregate of output voltage VOUT and the gate-source threshold voltages of transistors M4 and MOUT. However if supply voltage VDD is increased above this level, the gate-source voltage across transistor M4 will increase to a value which may cause it to enter its 'on' state and the auxiliary regulator may in this case fail to regulate correctly.

Figure 2:
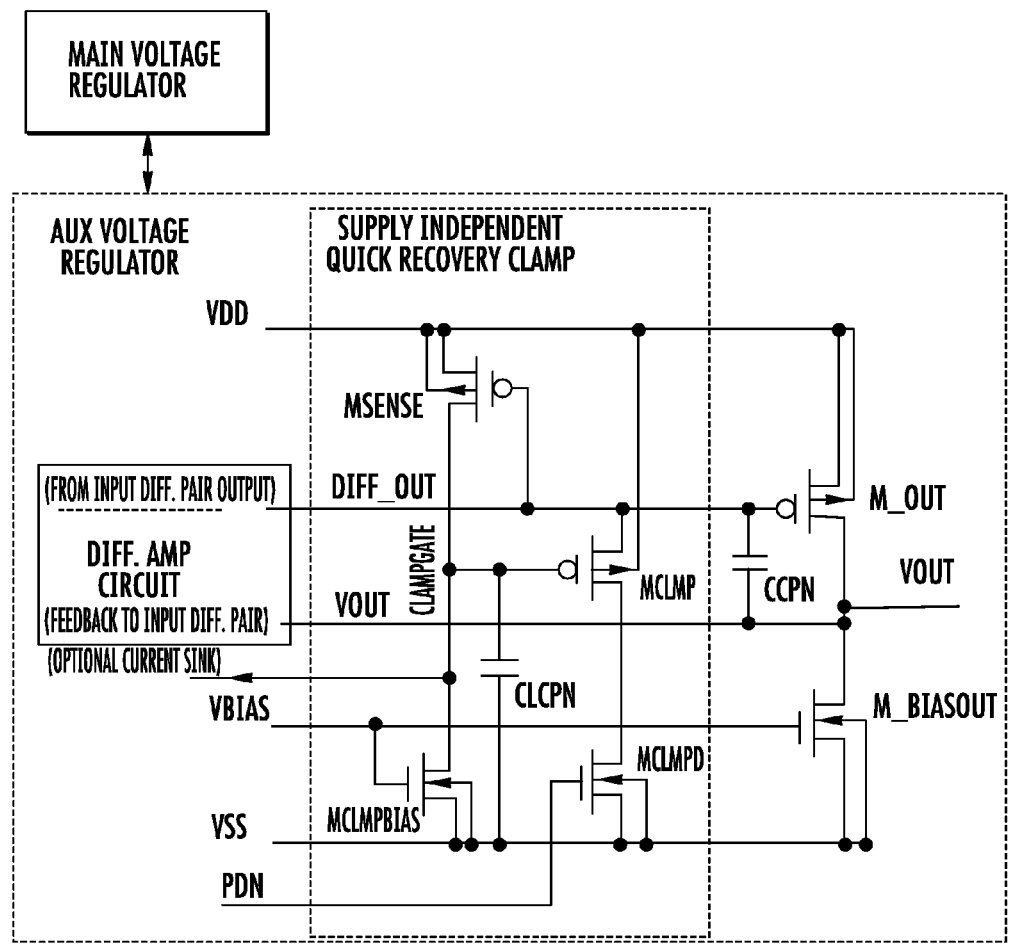
FIG. 2 shows a circuit for providing a quick recovery auxiliary voltage regulator according to a first embodiment of the invention.

FIG. 2 shows a circuit which addresses this drawback of the circuit in FIG. 1. The applicant has found that the underlying cause of the limitation of the circuit of FIG. 1, when faced with an increased supply voltage VDD, is that the gate of the 'quick recovery' clamp transistor (M4) is connected to output node VOUT and is therefore constrained, under closed loop conditions, to remain at a fixed level for all values of supply voltage VDD.

In FIG. 2 the gate of the clamp transistor MCLMP, is not connected to node VOUT. Instead it is connected to a bias point at the connection between the drain nodes of a PMOS/NMOS transistor pair MSENSE and MCLMBIAS placed across the supply rails VDD and VSS. The PMOS device MSENSE senses the magnitude of the gate-source voltage of the output device M_OUT and, when in standby mode, drives the voltage at the node CLAMPGATE high to force the clamp transistor MCLMP off, helping to ensure that it does not interfere with the normal operation of the auxiliary regulator. The NMOS device MCLMPBIAS is configured as a current source or conceptually as a very high value 'pull-down' resistor. The capacitor CLCPN is a compensation capacitor which helps ensure that the clamp circuit remains stable.

During the transition out of standby mode, when the main regulator is taking control of the output VOUT, by driving this node to a slightly higher voltage, the feedback loop of the auxiliary regulator may cause the level at the DIFF_OUT node to be driven towards the supply voltage VDD. Both output device M_OUT and device MSENSE may therefore begin to turn off. As the device MSENSE turns off however, the signal at the node CLAMPGATE falls. This causes the clamp device MCLMP to turn on and sink an increasing amount of current from the DIFF_OUT node (the output of the auxiliary regulator's 'input differential amplifier') until a state of equilibrium is reached and the rise at node DIFF_OUT and the fall at node CLAMPGATE are arrested. The output device M_OUT may not be turned off completely in this state of equilibrium which ensures that the auxiliary regulator can recover relatively quickly to its closed loop "on"-state when required. Note that, when the main regulator is in control, the auxiliary regulator may be in an 'open loop' state.

When the auxiliary regulator is in an 'open loop' state, and the output device M_OUT is not completely turned off, it is evident that the output device M_OUT may operate as a current source and provide current to the load. The magnitude of this current will depend on the extent to which M_OUT is on and can be set, for a given reference voltage VBIAS by adjusting the width-to-length ratios of one or more associated transistors. The ability to control the magnitude of the 'open loop' output current of the auxiliary regulator is a particularly useful feature of this circuit. It may, in particular, be exploited to control the magnitude of the 'negative' glitch which can occur in the regulator output voltage during a transition from the 'streaming' mode to the 'standby' mode, that is when the main regulator output falls and the auxiliary regulator regains control.

If the magnitude of the load current at output node VOUT in 'standby' mode is known, then the auxiliary regulator can be 'primed', whereby its 'open loop' output current is set to a value which is close to but less than the 'standby' current. When the main regulator is disabled and its output falls, following a reduction in load current to the 'standby' value, the change in the magnitude of the current into the load (which the auxiliary regulator must provide as it takes control) may in this case be relatively small. As a consequence the change in the voltage across the loop compensation capacitor CCPN may also be relatively small, facilitating a fast recovery of the auxiliary regulator and a reduction in the magnitude of the 'negative' glitch.

An additional feature of this circuit is that it lends itself to being primed for 'minimum glitch' by the sinking of an appropriate amount of current from its CLAMPGATE node via the optional current sink, as shown in FIG. 2. This feature may be used to adjust for variation in the regulator's 'standby' load current, by sensing its value and appropriately increasing or decreasing the current being drawn from this node, if necessary using automatic feedback control.

Figure 3:
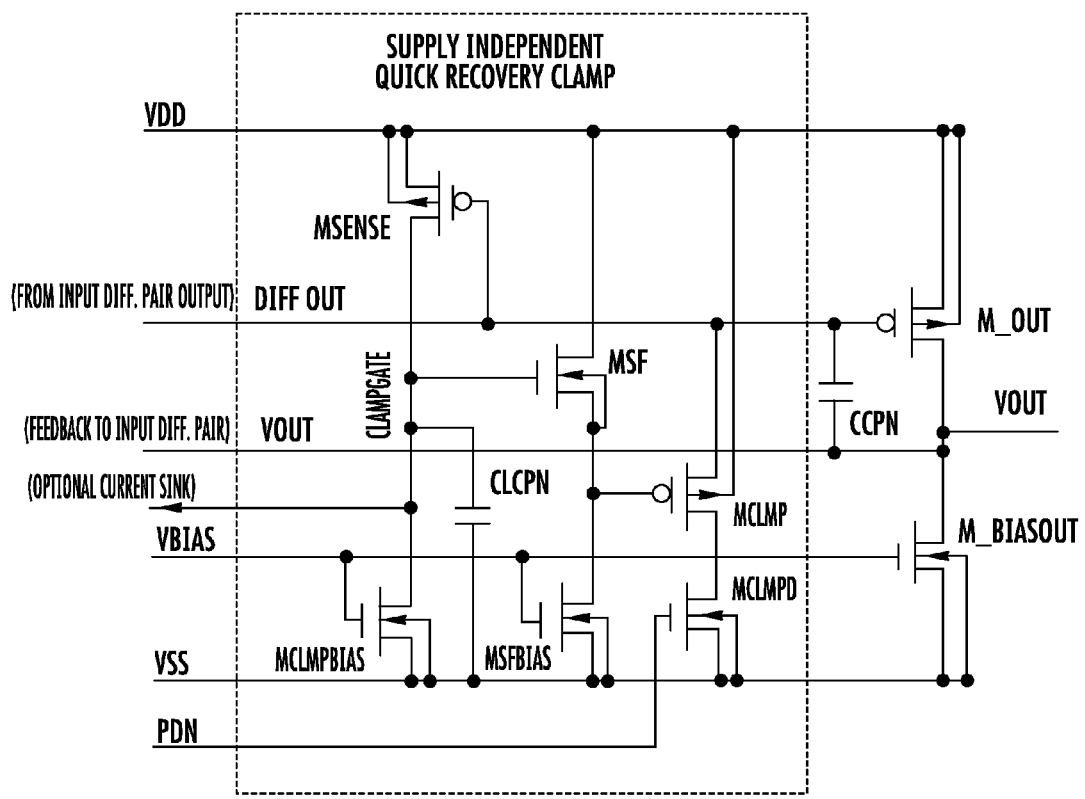
FIG. 3 shows a circuit for providing a quick recovery auxiliary voltage regulator according to a second embodiment of the invention.

However the voltage level at the CLAMPGATE node, for a given setting of the clamp, may cause voltage compliance issues for an associated current sink circuit. FIG. 3 shows a variation on the circuit of FIG. 2 to address the voltage compliance issue. It incorporates an additional source follower transistor MSF (with corresponding bias transistor MSF-BIAS). The source follower transistor MSF is arranged to provide a positive offset to the voltage at the CLAMPGATE node.

The above embodiments were provided for illustration only, and other embodiments and examples can be envisaged without departing from the spirit and scope of the invention. For example, while the example above describes positive output voltage regulation with a PMOS final stage, the invention is equally applicable to a negative output voltage regulation with a NMOS final stage, and all other device types reversed (PMOS to NMOS and NMOS to PMOS). In such a case it will be appreciated that the clamping device will source current at the gate of the output NMOS device to prevent it switching completely off.

That which is claimed is:

1. An output stage for a voltage regulator configured to provide a regulated supply to an apparatus when the apparatus is in a standby mode and comprising:
    at least one switchable output device having a control terminal, a first conduction terminal to be coupled to a first voltage supply, and a second conduction terminal providing the regulated supply;
    a clamping circuit being controlled in a supply independent mode and comprising a clamping device to reduce voltage swings on the control terminal when the apparatus is not in the standby mode, thereby allowing a faster switching of said at least one switchable output device when the apparatus is switched to the standby mode;
    a sense transistor having a control terminal coupled to the control terminal of said at least one switchable output device, a first conduction terminal to be coupled to the first voltage supply, and a second conduction terminal coupled to a bias point, said sense transistor configured to sense a voltage of said at least one switchable output device and, when the apparatus is in the standby mode, drives a voltage at the bias point high to force said clamping circuit off; and
    a further device having a control terminal coupled to the bias point, a first conduction terminal to be coupled to the first voltage supply, and a second conduction terminal coupled to the control terminal of said clamping device.

2. An output stage as in claim 1 wherein said further device is controlled based upon said control terminal of said at least one switchable output device.

3. An output stage as in claim 1 wherein said further device is configured to force said clamping device off when the apparatus operates in the standby mode.

4. An output stage as in claim 1 wherein said further device is controlled by the control terminal of said at least one switchable output device.

5. An output stage as in claim 1 wherein said clamping device is configured to prevent the output stage from turning off when the apparatus is not in the standby state.

6. An output stage as in claim 1 further comprising an output path coupled to the conduction terminal of said at least one switchable output device, and a current sink configured to sink current from said clamping circuit to thereby allow adjustment for a variation in a load current at the output path when the apparatus is in the standby mode.

7. An output stage as in claim 6 wherein said current sink is configured to allow adjustment via feedback control.

8. An output stage as in claim 7 wherein said clamping circuit further comprises an offset device for providing a voltage offset at said current sink.

9. An output stage as in claim 8 wherein said offset device comprises a transistor in a source follower configuration.

10. An output stage as in claim 8 wherein said at least one switchable output device and clamping device each comprises PMOS transistor devices, said clamping device configured to sink current at said control terminal of said at least one switchable output device when the apparatus is not in the standby mode.

11. An output stage as in claim 10 wherein each PMOS transistor device is paired with an NMOS biasing device.

12. An output stage as in claim 1 further comprising an output coupled to said at least one switchable output device; and wherein an open loop output current of the voltage regulator is set to a value less than a current drawn at said output when the apparatus is operating in the standby mode.

13. An output stage as in claim 1 wherein said clamping circuit is configured such that, as a signal on the control terminal of said at least one switchable output device rises and the apparatus exits the standby mode, said clamping device sinks current from the signal on the control terminal, in turn causing said clamping circuit to control said clamping device such that a state of equilibrium is reached, thereby preventing said at least one switchable output device from switching off.

14. A voltage regulator configured to provide a regulated supply to an apparatus when the apparatus is in a standby mode and comprising:
    a differential amplifier circuit configured to output a control signal based upon a signal feedback and a reference signal; and
    an output stage comprising
        at least one switchable output device having a control terminal coupled to said differential amplifier, a first conduction terminal to be coupled to a first voltage supply, and a second conduction terminal providing the regulated supply;
        a clamping circuit being controlled in a supply independent mode and comprising a clamping device to reduce voltage swings on the control terminal when the apparatus is not in the standby mode;
        a sense transistor having a control terminal coupled to the control terminal of said at least one switchable output device and to said differential amplifier, a first conduction terminal coupled to the first voltage supply, and a second conduction terminal coupled to a bias point, said sense transistor configured to sense a voltage of said at least one switchable output device and, when the apparatus is in the standby mode, drives a voltage at the bias point high to force said clamping circuit off; and a further device having a control terminal coupled to the bias point, a first conduction terminal to be coupled to the first voltage supply, and a second conduction terminal coupled to the control terminal of said clamping device.

15. A voltage regulator as in claim 14 wherein said clamping circuit is configured such that, as the control signal rises and the apparatus exits the standby mode, said clamping device sinks current from the signal on said control terminal, in turn causing said clamping circuit to control said clamping device such that a state of equilibrium is reached, thereby preventing said at least one switchable output device from switching off.

16. An apparatus comprising:
a main voltage regulator for a main operating mode; and
an auxiliary voltage regulator cooperating with said main voltage regulator, and comprising
a differential amplifier circuit configured to output a control signal based upon a signal feedback from the voltage regulator and a reference signal, and
an output stage comprising at least one switchable output device having a control terminal coupled to said differential amplifier, a first conduction terminal to coupled to a first voltage supply, and a second conduction terminal providing the regulated supply,
a clamping circuit being controlled in a supply independent mode and comprising a clamping device to reduce voltage swings on said control terminal when the apparatus is not in a standby mode, and
a sense transistor having a control terminal coupled to the control terminal of said at least one switchable output device and to said differential amplifier, a first conduction terminal to be coupled to the first voltage supply, and a second conduction terminal coupled to a bias point, said sense transistor configured to sense a voltage of said at least one switchable output device and, when the apparatus is in the standby mode, drives a voltage at the bias point high to force said clamping circuit off; and
a further device having a control terminal coupled to the bias point, a first conduction terminal to be coupled to the first voltage supply, and a second conduction terminal coupled to the control terminal of said clamping device.

17. An apparatus as in claim 16 wherein said clamping circuit is configured such that, as the control signal rises and the apparatus exits the standby mode, said clamping device sinks current from the signal on the control terminal, in turn causing said clamping circuit to control said clamping device such that a state of equilibrium is reached, thereby preventing said at least one switchable output device from switching off.

18. A method for controlling a signal level on a control terminal of a switchable output device of a voltage regulator, the switchable output device having a first conduction terminal coupled to a first voltage supply, and a second a conduction terminal for providing a regulated supply to an apparatus when the apparatus is in a standby mode, the method comprising:
reducing voltage swings on a control terminal of a clamping device, the control terminal thereby allowing a faster switching of the switchable output device when the apparatus is switched to the standby mode; and
sensing a voltage of the switchable output device with a sense transistor having a control terminal coupled to the control terminal of the switchable output device, a first conduction terminal coupled to the first voltage supply, and a second conduction terminal coupled to a bias point, and when the apparatus is in the standby mode, driving a voltage at the bias point high to force the clamping device off;
sinking current from the control terminal of the switchable output device to adjust for variation in a standby load current of the voltage regulator; and
controlling the claiming device using a further device having a control terminal coupled to the bias point, a first conduction terminal to be coupled to the first voltage supply, and a second conduction terminal coupled to the control terminal of the clamping device.

19. A method as in claim 18 wherein the further device is controlled based upon the control terminal of the output device.

20. A method as in claim 18 further comprising setting an open loop output current of the voltage regulator to a value less than a current drawn at an output of the output stage when the apparatus is operating in the standby mode.

* * * * *

UNITED STATES PATENT AND TRADEMARK OFFICE
CERTIFICATE OF CORRECTION

PATENT NO.        : 8,760,132 B2                              Page 1 of 1
APPLICATION NO.   : 12/822559
DATED             : June 24, 2014
INVENTOR(S)       : Rasaratnam It is certified that error appears in the above-identified patent and that said Letters Patent is hereby corrected as shown below:

In the Claims

Column 7, Lines 23-24    Delete: "terminal to coupled"
                         Insert: --terminal coupled--

Signed and Sealed this
Thirtieth Day of June, 2015

Michelle K. Lee
*Director of the United States Patent and Trademark Office*